United States Patent
Inamori

(10) Patent No.: US 8,640,549 B2
(45) Date of Patent: Feb. 4, 2014

(54) STRAIN GAGE AND MANUFACTURING METHOD THEREOF

(75) Inventor: Dohaku Inamori, Nagano (JP)

(73) Assignee: Minebea Co., Ltd., Nagano (JP)

( * ) Notice: Subject to any disclaimer, the term of this patent is extended or adjusted under 35 U.S.C. 154(b) by 24 days.

(21) Appl. No.: 13/430,994

(22) Filed: Mar. 27, 2012

(65) Prior Publication Data

US 2012/0247220 A1    Oct. 4, 2012

(30) Foreign Application Priority Data

Mar. 30, 2011  (JP) .................................. 2011-074333

(51) Int. Cl.
*G01B 7/16*    (2006.01)
*G01L 1/00*    (2006.01)

(52) U.S. Cl.
USPC ........................... 73/766; 73/774; 73/862.381

(58) Field of Classification Search
USPC ...................................... 73/766, 774, 862.381
See application file for complete search history.

(56) References Cited

U.S. PATENT DOCUMENTS

| | | | | |
|---|---|---|---|---|
| 3,624,714 | A | * | 11/1971 | Frassrand ........................ 73/148 |
| 5,184,520 | A | * | 2/1993 | Naito ........................ 73/862.623 |
| 5,929,390 | A | * | 7/1999 | Naito et al. .................... 177/211 |
| 2004/0027228 | A1 | * | 2/2004 | Stevens ............................ 338/2 |
| 2010/0251831 | A1 | * | 10/2010 | Hose von Wolfframsdorff et al. ........................ 73/862.045 |
| 2011/0094314 | A1 | * | 4/2011 | Dekker et al. ........... 73/862.045 |

FOREIGN PATENT DOCUMENTS

JP    S62-10628 U    1/1987

* cited by examiner

*Primary Examiner* — Lisa Caputo
*Assistant Examiner* — Jonathan Dunlap
(74) *Attorney, Agent, or Firm* — Carrier Blackman & Associates, P.C.; Joseph P. Carrier; William D. Blackman

(57) ABSTRACT

A strain gage includes a strain sensitive element; and a temperature compensation element, wherein the strain sensitive element and temperature compensation element are monolithically formed. A method of manufacturing the strain gage includes: exposing and developing a strain sensitive element pattern and the temperature compensation element pattern; and etching the strain sensitive element pattern and the temperature compensation element pattern.

7 Claims, 5 Drawing Sheets

STRAIN GAGE AND MANUFACTURING METHOD THEREOF

CROSS-REFERENCE TO RELATED APPLICATION

This application claims priority from Japanese Patent Application No. 2011-074333 filed on Mar. 30, 2011, the entire subject matter of which is incorporated herein by reference.

TECHNICAL FIELD

This disclosure relates to a strain gage and a manufacturing method thereof, and more specifically, to a strain gage with a monolithic temperature compensation element and a manufacturing method thereof.

BACKGROUND

In the related art, it is known that there is a technique to detect the strain of an object to be measured by attaching a strain gage to the object to be measured and configuring a bridge circuit using the stain gage.

A method of forming circuit wirings of the strain gage and the bridge circuit with the same metal foil and a method of forming circuit wiring with Flexible Printed Circuit (FPC) separately from the strain gage and bonding the wiring by soldering are known.

Further, in the related art, it is known that there is a technique to use a temperature compensation element for temperature compensation of a strain gage. (for example, JP-UM-A-S62-10628)

SUMMARY

However, with respect to the strain gage in the related art, it is necessary that a strain sensitive element having high specific resistance and low temperature coefficient of resistance and a temperature compensation element having low specific resistance and high temperature coefficient of resistance are separately formed, bonded together, and then wired.

Because of this, a step portion occurs on a bonded portion in the thickness direction by solder or the like. If such a step portion is positioned, for example, in a stress-strain field, stress concentration occurs therein to cause a fear of fatigue fracture.

Accordingly, this disclosure has been made in consideration of the above-described situations, and this disclosure provides at least a strain gage and a manufacturing method thereof, in which a need to bond a strain sensitive element and a temperature compensation element is eliminated and it is unlikely to occur fatigue fracture due to the stress concentration onto a bonded portion.

In view of the above, a strain gage of this disclosure comprises: a strain sensitive element; and a temperature compensation element, wherein the strain sensitive element and temperature compensation element are monolithically formed.

In the above-described strain gage, a plurality of the strain sensitive elements may be provided, and a full-bridge circuit may be configured by the plurality of the stress sensitive elements and the temperature compensation element.

In the above-described strain gage, an output temperature compensation element may be arranged on an input side.

In the above-described strain gage, wherein the temperature compensation element may be configured by: a first layer made of a first material, which is the same as a material of the strain sensitive element; and a second layer made of a second material, which is a different from the first material, wherein the second layer may be formed on the first layer.

In the above-described strain gage, the temperature compensation element and the output temperature compensation element may have temperature compensation resistances, respectively.

In the above-described strain gage, the second material may have lower specific resistance and higher temperature coefficient of resistance than the first material.

In the above-described strain gage, the second material may be one of Cu and Ni. In case that the second material is Cu, the first material is CuNi, and in case that the second material is Ni, the first material is NiCr.

A method of manufacturing a strain gage of this disclosure, comprises the sequential steps of: producing a laminated sheet composed of a metal foil and a sheet-like resin material; applying and drying a first resist; exposing and developing a temperature compensation element pattern; depositing a film; peeling off the first resist; applying and drying a second resist; exposing and developing a strain sensitive element pattern and the temperature compensation element pattern; etching the strain sensitive element pattern and the temperature compensation element pattern; and peeling off the second resist.

According to this disclosure, the strain gage and the manufacturing method thereof can be provided, in which the need to bond the strain sensitive element and the temperature compensation element is eliminated and it is unlikely to occur fatigue fracture due to the stress concentration onto the bonded portion.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, preferred illustrative embodiments of this disclosure will be described with reference to the drawings.

Figure 1:
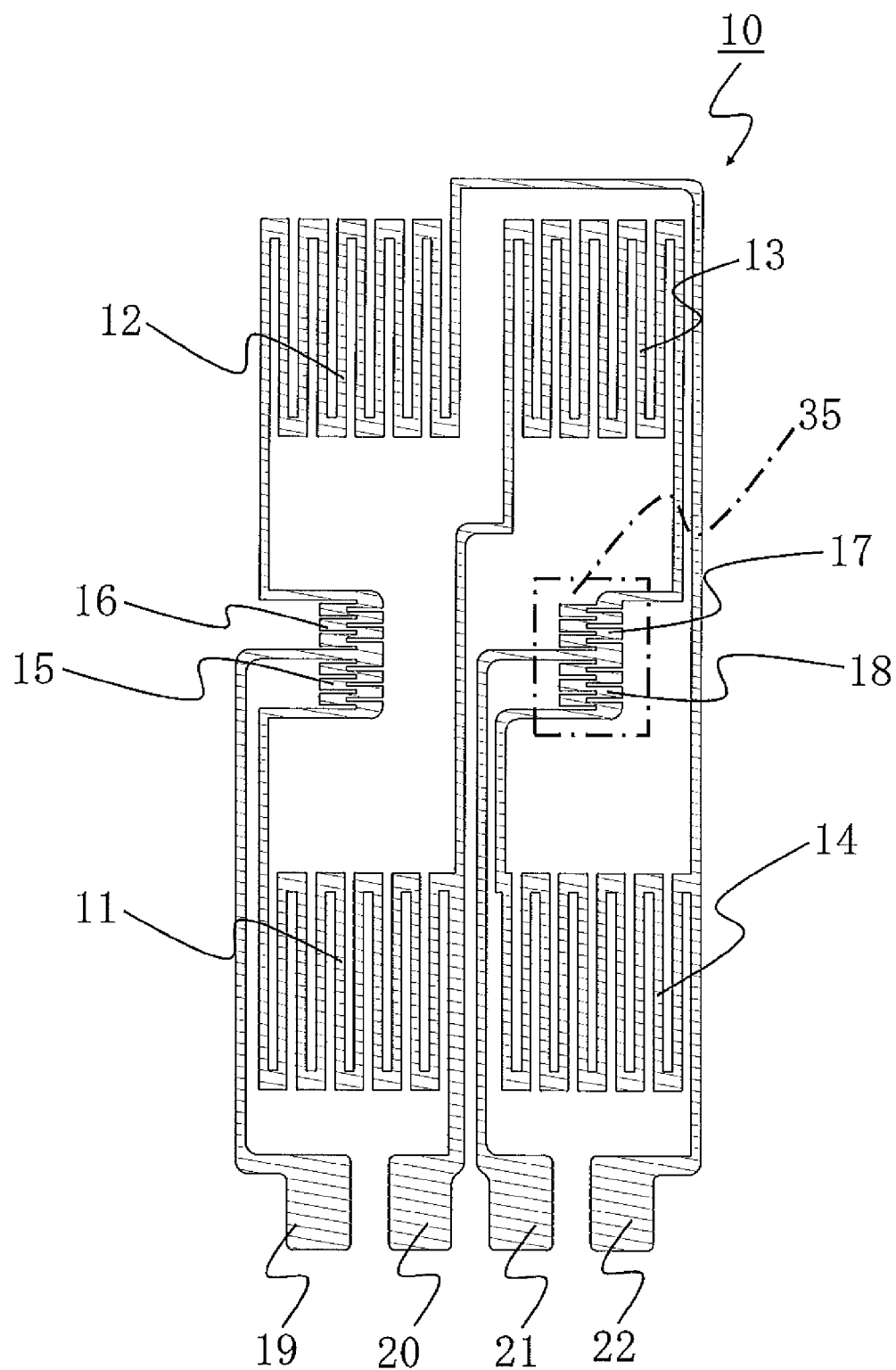
FIG. 1 is a plan view illustrating the configuration of a strain gage according to an illustrative embodiment of this disclosure.

FIG. 1 is a plan view illustrating the configuration of a strain gage 10 according to an illustrative embodiment of this disclosure.

Although the strain gage 10 is formed in the shape of a flexible substrate, for example, by providing metal foil on a sheet-like polyimide resin material and patterning the metal foil. Incidentally, the type of resin material does not matter especially.

The strain gage 10 according to this illustrative embodiment of this disclosure includes electrodes 19, 20, 21, and 22 formed on a sheet-like resin material, elements 11, 12, 13, and 14 that are strain sensitive elements (gage resistance elements), zero-point equilibrium compensation (balance adjustment) elements 15 and 16, and zero-point temperature compensation (temperature adjustment) elements 17 and 18. An area 35 that is surrounded by a dashed line in FIG. 1 is an area in which plating is performed in a manufacturing process to be described later with reference to FIG. 5.

Each element is configured as a electrical resistance, and the zero-point equilibrium compensation elements 15 and 16 are formed in order to compensate, if necessary, for the equilibrium (adjust the balance) of a zero point of the full-bridge circuit, for example, by making cut off of the metal foil so that the resistance value is adjusted. Further, the zero-point temperature compensation elements 17 and 18 are formed in order to compensate, if necessary, for the temperature (adjust) of the zero point of the full-bridge circuit, for example, by making cut off of the metal foil and the plating film and if necessary so that the resistance value is adjusted.

One end of the element 15 is connected to the electrode 19 and is also connected to one end of the element 16, and the other end of the element 15 is connected to one end of the element 11. The other end of the element 11 is connected to the electrode 20 and is also connected to one end of the element 13. The other end of the element 13 is connected to one end of the element 17.

The other end of the element 17 is connected to the electrode 21 and is also connected to one end of the element 18, and the other end of the element 18 is connected to one end of the element 14. The other end of the element 14 is connected to the electrode 22 and is also connected to one end of the element 12. The other end of the element 12 is connected to the other end of the element 16.

On the other hand, needless to say, it is also possible to deposit a metal film by other means, such as vapor deposition or sputtering, instead of the plating.

Figure 2:
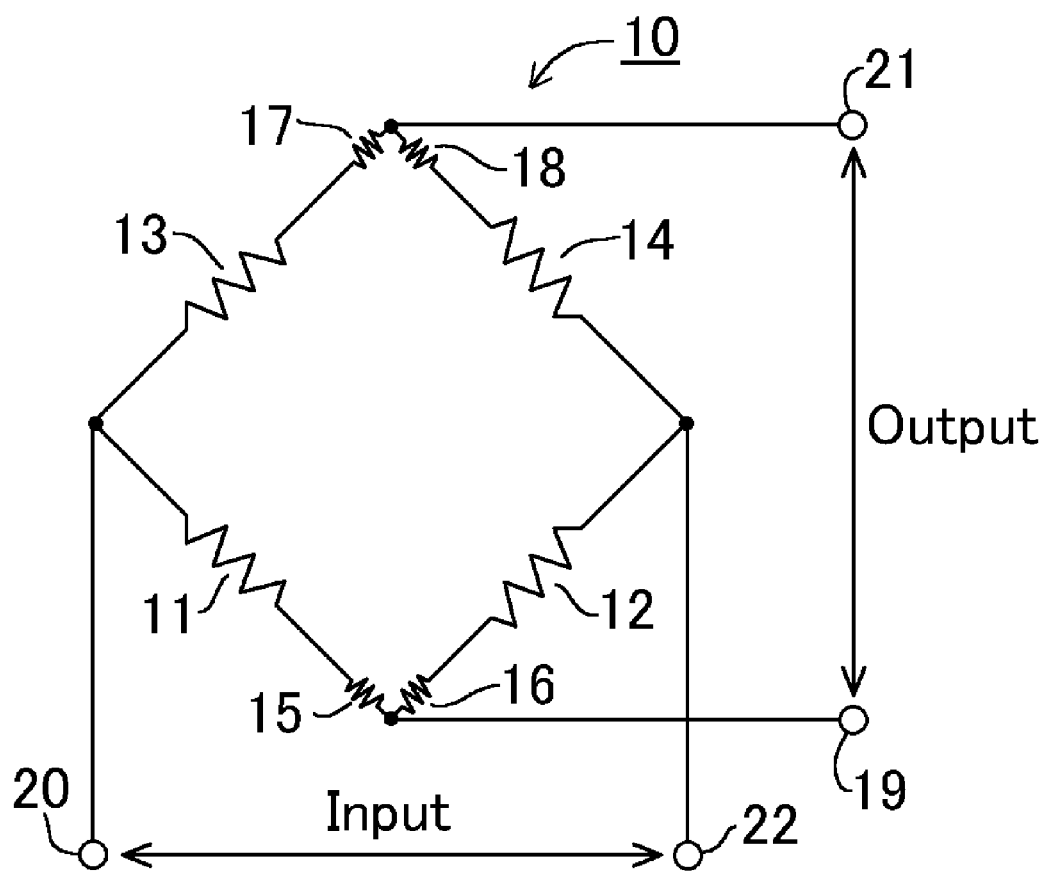
FIG. 2 is a circuit diagram of a full-bridge circuit using a strain gage illustrated in FIG. 1.

FIG. 2 illustrates an example of a full-bridge circuit that is configured by the strain gage 10 illustrated in FIG. 1 according to this illustrative embodiment of this disclosure.

In the full-bridge circuit of FIG. 2, according to the principle of an existing Wheatstone bridge circuit, for example, an input voltage is applied between the electrodes 20 and 22, then an output is obtained between the electrodes 19 and 21 is amplified by an amplifier (not illustrated), and thus the amplified output is used as the result of detecting strain. In an illustrative embodiment of this disclosure, the zero-point temperature compensation elements 17 and 18 are monolithically formed in the full-bridge circuit.

In this illustrative embodiment of this disclosure, the electrodes 19, 20, 21, and 22, the strain sensitive elements 11, 12, 13, and 14, and the zero-point equilibrium compensation elements 15 and 16 are formed of the same metal foil. Further, the zero-point temperature compensation elements 17 and 18 are formed by plating a predetermined metal on the surface of metal foil that is formed by the same type as that of the strain sensitive elements. Such materials will be described in descriptions of the manufacturing method with reference to FIG. 5.

According to this illustrative embodiment of this disclosure, since the temperature compensation elements (temperature adjustment elements) and the strain sensitive elements are monolithically formed, solder bonding is not required, and thus process reduction and miniaturization of the product become possible.

Further, according to this illustrative embodiment of this disclosure, since the temperature compensation elements (temperature adjustment elements) are monolithically formed by plating on the metal foil, the difference in thickness (step portion) between bonded portions of other elements is of several μm. Accordingly, it is unlikely that the fatigue fracture is caused due to the stress concentration onto the bonded portion, and thus high fatigue life can be achieved.

Figure 3:
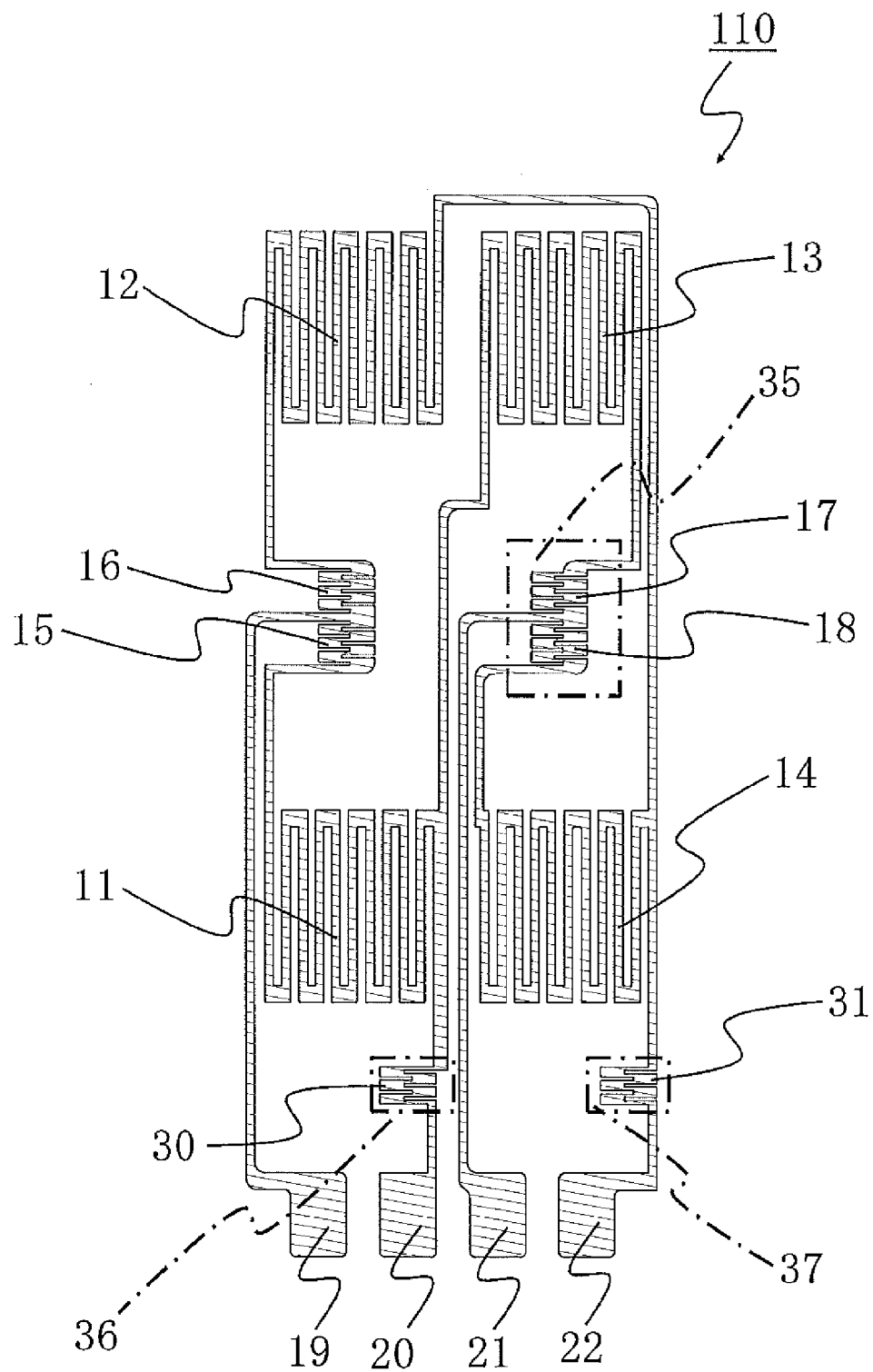
FIG. 3 is a plan view illustrating the configuration of a strain gage according to another illustrative embodiment of this disclosure.

FIG. 3 is a plan view illustrating the configuration of the strain gage 110 according to another illustrative embodiment of this disclosure.

Although the strain gage 110 is formed, for example, by providing metal foil on a sheet-like polyimide resin material, the type of resin material does not matter especially.

The strain gage 110 according to this illustrative embodiment of this disclosure includes electrodes 19, 20, 21, and 22 formed on a sheet-like resin material, strain sensitive elements (gage resistance elements) 11, 12, 13, and 14, zero-point equilibrium compensation (balance adjustment) elements 15 and 16, zero-point temperature compensation (adjustment) elements 17 and 18, and output temperature compensation (adjustment) elements 30 and 31. Areas 35, 36, and 37 that are surrounded by dashed lines in FIG. 3 are areas in which plating is performed in a manufacturing process to be described later with reference to FIG. 5. That is, the zero-point temperature compensation elements 17 and 18 and the output temperature compensation elements 30 and 31 are formed by performing plating on the metal foil.

Each element is configured as a electrical resistance, and the zero-point equilibrium compensation elements 15 and 16 are formed in order to compensate, if necessary, for (adjust) the equilibrium of the zero point of the full-bridge circuit, for example, by making cut off of the metal foil so that the resistance value is adjusted. Further, the zero-point temperature compensation elements 17 and 18 are formed in order to compensate, if necessary, for (adjust) the temperature of the zero point of the full-bridge circuit, for example, by making cut off of the metal foil and the plating film so that the resistance value is adjusted. Further, the output temperature compensation elements 30 and 31 are formed in order to compensate, if necessary, for (adjust) the temperature of the output of the full-bridge circuit, for example, by making cut off of the metal foil and the plating film so that the resistance value is adjusted.

One end of the element 15 is connected to the electrode 19 and is also connected to one end of the element 16, and the other end of the element 15 is connected to one end of the element 11. The other end of the element 11 is connected to one end of the element 30 and is also connected to one end of the element 13. The other end of the element 13 is connected to one end of the element 17. The other end of the element 30 is connected to the electrode 20.

The other end of the element 17 is connected to the electrode 21 and is also connected to one end of the element 18, and the other end of the element 18 is connected to one end of the element 14. The other end of the element 14 is connected to one end of the element 31 and is also connected to one end of the element 12. The other end of the element 12 is connected to the other end of the element 16. The other end of the element 31 is connected to the electrode 22.

Figure 4:
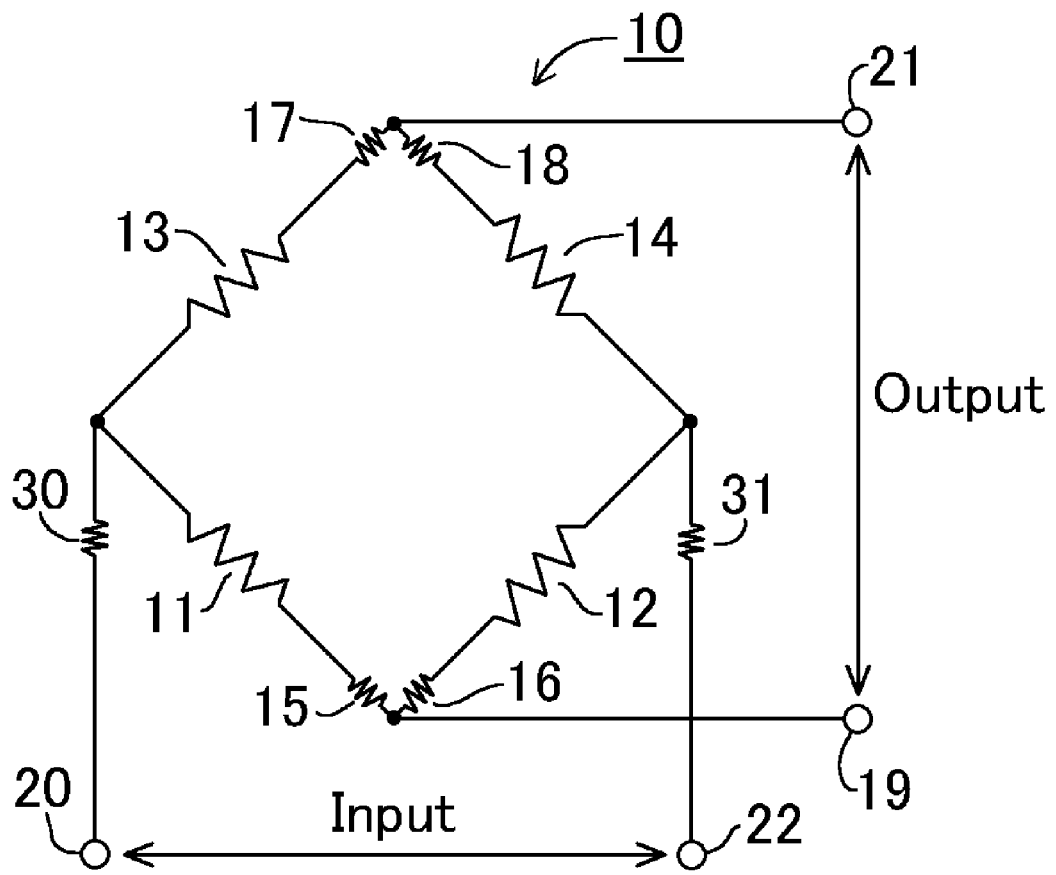
FIG. 4 is a circuit diagram of a full-bridge circuit using a strain gage illustrated in FIG. 3.

FIG. 4 illustrates an example of a full-bridge circuit that is configured by the strain gage 110 illustrated in FIG. 3 according to this illustrative embodiment of this disclosure.

In the full-bridge circuit of FIG. 4, according to the principle of an existing Wheatstone bridge circuit, for example, an input voltage is applied between the electrodes 20 and 22, then an output is obtained between the electrodes 19 and 21 is amplified by an amplifier (not illustrated), and thus the amplified output is used as the result of detecting strain. In an illustrative embodiment of this disclosure, the zero-point temperature compensation elements 17 and 18 are monolithically formed in the full-bridge circuit.

In this illustrative embodiment of this disclosure, the electrodes 19, 20, 21, and 22, the strain sensitive elements 11, 12, 13, and 14, the zero-point equilibrium compensation elements 15 and 16, and the output temperature compensation elements 30 and 31 are formed of the same metal foil, and the zero-point temperature compensation elements 17 and 18 and the output temperature compensation elements 30 and 31 are formed by plating a predetermined metal on the surface of metal foil that is the same type as that of the strain sensitive elements. Such materials will be described in descriptions of the manufacturing method with reference to FIG. 5.

The temperature compensation of the full-bridge circuit of FIG. 4 is performed by the output temperature compensation resistors 30 and 31 that are arranged on the input side and the zero-point temperature compensation resistors 17 and 18 that are arranged in the full-bridge circuit.

According to this illustrative embodiment of this disclosure, since the temperature compensation elements (temperature adjustment elements) and the strain sensitive elements are monolithically formed, solder bonding is not required, and thus process reduction and miniaturization of the product become possible.

Further, according to this illustrative embodiment of this disclosure, since the temperature compensation elements (temperature adjustment elements) are formed by plating as a metal foil shape, the difference in thickness (step portion) between bonded portions of other elements is of several μm. Accordingly, it is unlikely that the fatigue fracture is caused due to the stress concentration onto the bonded portion, and thus high fatigue life can be ensured.

Figure 5:
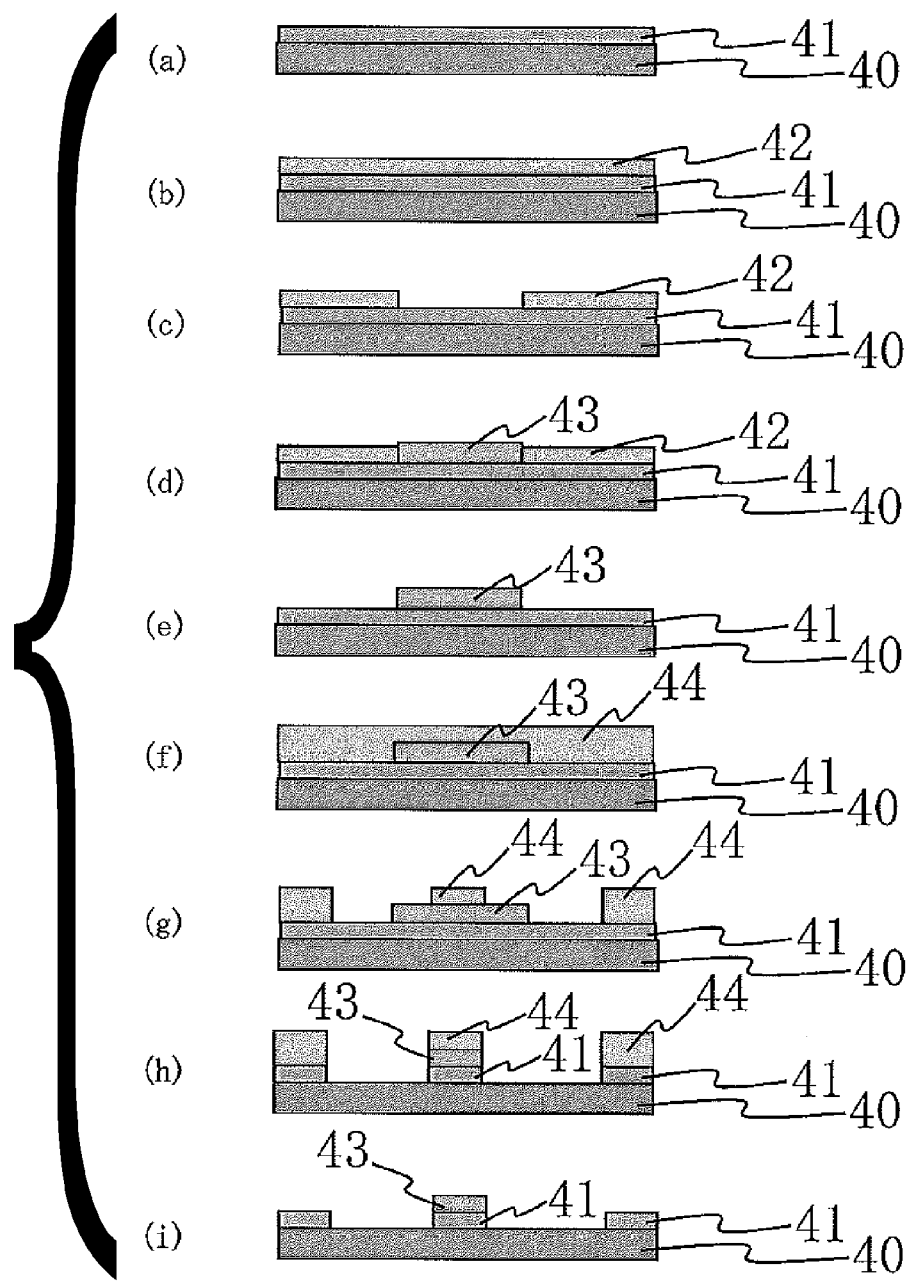
FIG. 5 is side cross-sectional views illustrating processes of a method of manufacturing a strain gage in order according to an illustrative embodiment of this disclosure.

FIG. 5, which includes parts (a) to (i), to is side cross-sectional views illustrating processes of a method of manufacturing a strain gage in order according to an illustrative embodiment of this disclosure. Hereinafter, parts (a) to (i) of FIG. 5 is referred to as FIG. 5(a) to FIG. 5(i), respectively.

First, as shown in FIG. 5(a), a laminated sheet that is made of metal foil 41 and polyimide 4 is produced.

Then, as shown in FIG. 5(b), a first resist 42 is coated and dried.

Then, as shown in FIG. 5(c), a pattern of temperature compensation elements (the above-described temperature compensation elements 17 and 18 or temperature compensation elements 17, 18, 30, and 31 as described above) is exposed and developed.

Then, as shown in FIG. 5(d), with respect to the area 35 as shown in FIG. 1 or the areas 35, 36, and 37 as shown in FIG. 3, plating 43 of a predetermined metal is performed.

Then, as shown in FIG. 5(e), the first resist 42 is peeled off.

Then, as shown in FIG. 5(f), a second resist 44 is coated and dried.

Then, as shown in FIG. 5(g), processes of exposing and developing the strain sensitive elements (the above-described strain sensitive elements 11, 12, 14, and 14), the temperature compensation elements (the above-described temperature compensation elements 17 and 18 or the temperature compensation elements 17, 18, 30, and 31), or if necessary the zero-point equilibrium compensation elements (the above-described equilibrium compensation elements 15 and 16), and wiring patterns are performed. Then, as shown in FIG. 5(h), etching of the strain sensitive elements (the above-described strain sensitive elements 11, 12, 14, and 14), the temperature compensation elements (the above-described temperature compensation elements 17 and 18 or the temperature compensation elements 17, 18, 30, and 31), or if necessary the zero-point equilibrium compensation elements (the above-described equilibrium compensation elements 15 and 16), and the wiring patterns is performed. On the other hand, for example, the pattern may be formed by performing simultaneous etching of two-layer metal once using a ferric chloride solution.

Then, as shown in FIG. 5(i), the second resist 44 is peeled off.

In this illustrative embodiment of this disclosure, as shown in FIG. 5(d), the plating 43 by the predetermined metal is performed. However, this disclosure is not limited thereto, and the temperature compensation elements may be formed by depositing a predetermined metal film through other means, such as vapor deposition or sputtering.

When the voltage constant with the temperature is applied, a voltage that is actually applied to the bridge circuit by a resistance body, of which the electrical resistance value is increased along with the temperature increase is lowered, so that the temperature compensation of the output is performed by offsetting the increased sensitivity of the strain gage due to the temperature increase and the increased sensitivity due to the decrease of longitudinal elasticity modulus of an elastic body. Accordingly, it is preferable that the resistance body is made of a material having high temperature coefficient of resistance, such as Cu and Ni.

Further, in performing the zero-point temperature compensation of the bridge circuit, although the strain sensitive element (detection element) is produced by a resistance made of a material of which the temperature coefficient of resistance is almost zero, the minute difference is amplified by the bridge circuit, and thus the zero-point temperature compensation is performed by adjustment of the resistance body having low specific resistance and high temperature coefficient of resistance provided in the bridge circuit.

Here, in order to compensate for the balance of the bridge circuit that is changed through the resistance adjustment of the temperature compensation elements 17 and 18, the zero-point balance adjustment elements 15 and 16 are also used in the bridge circuit with low temperature coefficient of resistance.

Since the specific resistance of Cu is sufficiently lower than a CuNi alloy, the specific resistance of Ni is sufficiently lower than a NiCr alloy, and Cu and Ni are main components of the strain measurement resistance body alloys, respectively, they have good adhesion through plating or sputtering (deposition). Accordingly, it is preferable that in the case of using a CuNi alloy for the strain sensitive elements 11, 12, 13, and 14, the zero-point temperature compensation elements 17 and 18 or the output temperature compensation elements 30 and 31 are formed by Cu plating or sputtering, while in the case of using a NiCr alloy for the strain sensitive elements 11, 12, 13, and 14, then the zero-point temperature compensation elements 17 and 18 or the output temperature compensation elements 30 and 31 are formed by Ni plating or sputtering.

This disclosure is not limited to those as described above, and many modifications and combinations may be made without departing from the scope of this disclosure.

What is claimed is:

1. A strain gage comprising:
   a strain sensitive element; and
   a temperature compensation element,
   wherein the strain sensitive element and temperature compensation element are monolithically formed,
   wherein the temperature compensation element is configured by:
      a first layer made of a first material, which is the same as a material of the strain sensitive element; and
      a second layer made of a second material, which is a different from the first material, wherein the second layer is formed on the first layer.

2. The strain gage according to claim 1,
wherein a plurality of the strain sensitive elements are provided, and
wherein a full-bridge circuit is configured by the plurality of the stress sensitive elements and the temperature compensation element.

3. The strain gage according to claim 2,
wherein an output temperature compensation element is arranged on an input side.

4. The strain gage according to claim 3,
wherein the temperature compensation element and the output temperature compensation element have temperature compensation resistances, respectively.

5. The strain gage according to claim 1,
wherein the second material has lower specific resistance and higher temperature coefficient of resistance than the first material.

6. The strain gage according to claim 5,
wherein the second material is one of Cu and Ni,
wherein, in case that the second material is Cu, the first material is CuNi, and
wherein, in case that the second material is Ni, the first material is NiCr.

7. A method of manufacturing a strain gage, comprising the sequential steps of:
    producing a laminated sheet composed of a metal foil and a sheet-like resin material;
    applying and drying a first resist;
    exposing and developing a temperature compensation element pattern;
    depositing a film;
    peeling off the first resist;
    applying and drying a second resist;
    exposing and developing a strain sensitive element pattern and the temperature compensation element pattern;
    etching the strain sensitive element pattern and the temperature compensation element pattern; and
    peeling off the second resist.

\* \* \* \* \*